United States Patent Office 3,083,797
Patented Apr. 2, 1963

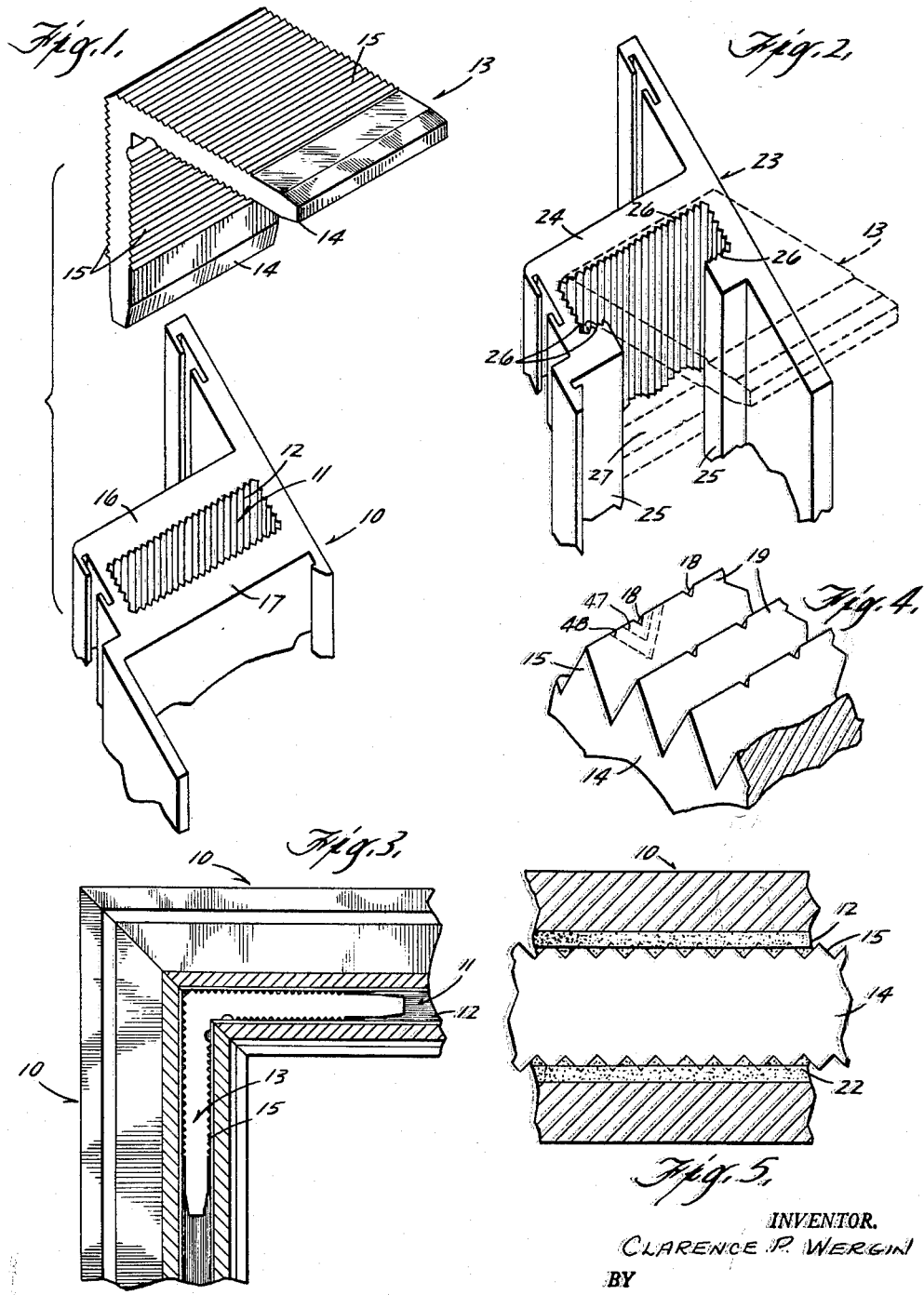

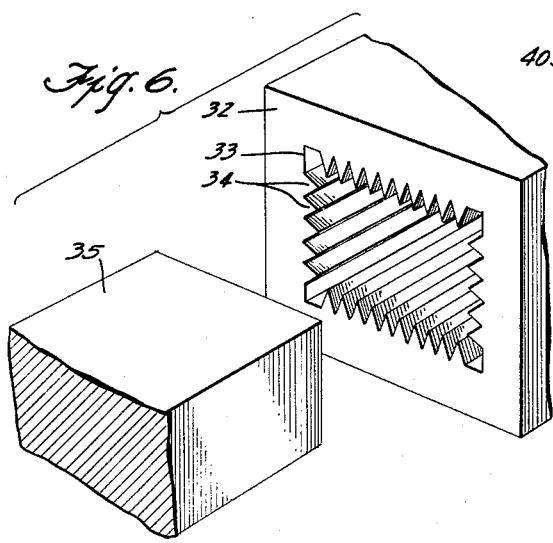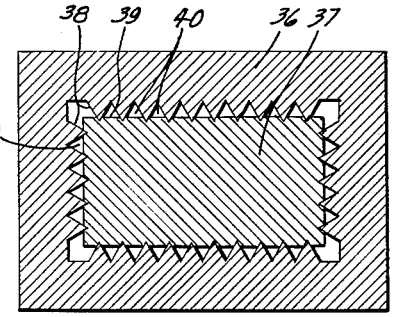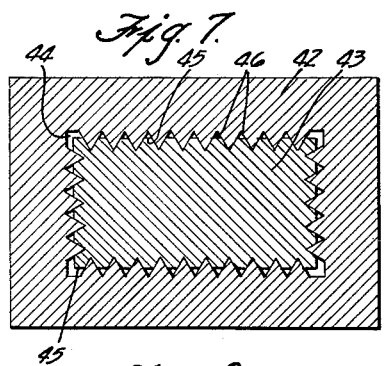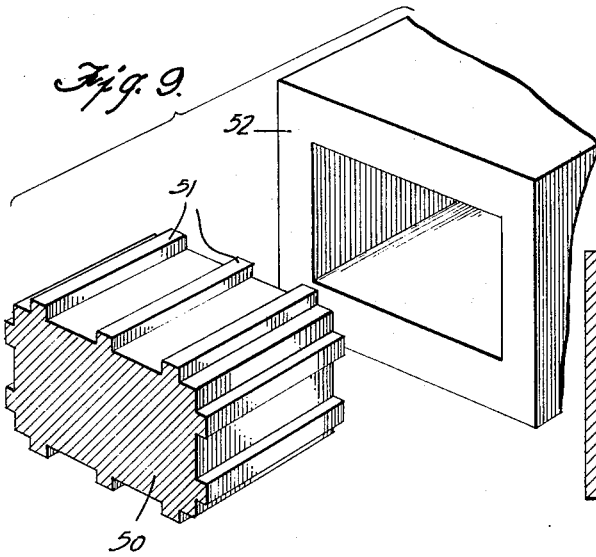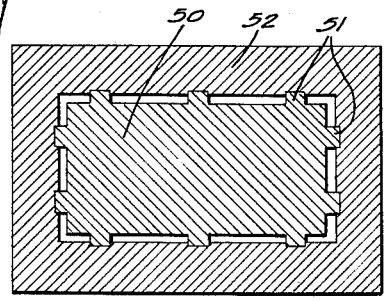

3,083,797
TRANSVERSELY RIBBED DOWEL AND SOCKET COUPLING
Clarence P. Wergin, Pine Island, Schofield, Wis.
Filed Mar. 1, 1960, Ser. No. 12,218
9 Claims. (Cl. 189—36)

This invention relates to an improved dowel and socket coupling.

While the invention is not limited to coupling frame members of buildings, the embodiments specifically disclosed herein to exemplify the invention relate to such building framing members.

Window frames, sash, curtainwalls, etc., of metal, plastic and like material, conventionally comprise framing elements interconnected by metal dowels, etc., which bridge across the joint between such framing members. A frequently encountered joint is at a corner where the respective framing members intersect at a miter joint.

Dowels heretofore used in commercial practice have not been entirely effective to permanently and securely fasten the framing members. Prior commercial couplings are subject to loosening when the framing elements are subjected to thermal, weight, wind pressure, and such other stresses as tend to dislocate the parts, and to corrosion. Such couplings frequently need extraneous spline, rivet or screw elements to anchor the dowel in its socket.

A particularly troublesome problem in doweling together metal frame members is that of maintaining tolerances. As the extrusion dies wear, the dimensions of the shapes produced therein will change. Dowel and socket parts designed to fit together under certain pressure and stress conditions will require increased pressure and will be subject to increased stresses as the dies wear. Accordingly, dowel and socket parts produced by worn dies will require excessive closing pressures and may be subject to undesirable deflection and deformation stresses in assembly and thereafter.

According to the present invention, the dowel is securely and permanently mechanically interlocked with the framing elements in the complete absence of extraneous fasteners. Once coupled, it is virtually impossible to loosen or separate the parts.

The problem of tolerance control is solved in the present invention by materially reducing the area of the respective dowel and socket parts which make contact in the course of closing these parts. Variations in measurements of the dowel and socket parts will change the area in contact, but the overall reduction in area so materially reduces the pressure required to close the parts that undesirable stresses are avoided, even when the dies are quite worn.

Reduction in area of contact is accomplished in a uniform pattern so that the respective dowel and socket part surfaces interengage over broad areas for good interlocking therebetween, notwithstanding the net reduction of area.

The invention may be embodied in different specific structures. In one embodiment of the present invention, opposed walls of the socket in the framing element and corresponding opposed walls of the dowel are respectively transversely ribbed. The ribs on opposite walls of the socket are less widely spaced than ribs on the opposite walls of the dowel. The dowel is forced into the socket under heavy pressure, such as is produced by hydraulic presses and the like. As the dowel enters the socket, the ribs of one element score or cut into the ribs of the other element. When the parts are completely closed, the ribs interlock in a broad grid pattern wherever the transverse ribs intersect. There are literally hundreds of intersections at both sides of the dowel. Each intersection involves an overlap of one rib with respect to the other of only a few hundredths of an inch. The composite effect is cumulative, however, and the broad distribution of interlocked parts over the major surface of the coupled parts results in a superior bond therebetween. In a physical sense, the interlocked apices of the ribs are fused mechanically.

In another embodiment of the invention, only one of the dowel and socket parts is ribbed, the other having smooth walls. Accordingly, the ribbed surfaces of the one part score or cut into the smooth wall of the other part. In the spaces between the ribs, no contact is made between the parts, with correspondingly reduced requirements for pressure and resultant induced stresses.

In some embodiments the ribs will be closely spaced, in other embodiments the ribs may be quite widely spaced. The ribs may be square or triangular in cross section. The triangular cross section has certain advantages which make it preferable for certain embodiments.

The coupling parts may optionally be coated with an adhesive, such as a chemical setting adhesive typified by epoxy resin. The ribbed surfaces of the parts greatly increases the area of the parts exposed to the adhesive, thus increasing the binding power of the adhesive.

Other objects, features and advantages of the invention will appear from the following disclosure in which:

FIG. 1 is a perspective view in spaced apart relationship of a socketed framing element and a dowel embodying the invention.

FIG. 2 is a perspective view of a modified embodiment of socketed member, a dowel inserted thereinto being shown in broken lines.

FIG. 3 is a cross section taken through framing elements coupled at a miter joint according to the present invention.

FIG. 4 is an enlarged fragmentary perspective view of ribs on the dowel and showing how the apices of said ribs are notched or scored by the ribs of the socket in the course of inserting the dowel into the socket.

FIG. 5 is a fragmentary enlarged cross section showing the interlocking of the transversely related ribs of the socketed member and the dowel.

FIG. 6 is a perspective view in spaced apart relation of a ribbed socket part and a smooth walled dowel.

FIGS. 7 and 8 are cross sections taken through a coupling in which the socket part is ribbed and the dowel part is smooth walled. FIG. 7 illustrates the relative position of the coupled parts when the dies used for manufacturing the socket part and dowel part are new. FIG. 8 illustrates the relative position of the parts when the dies used for manufacturing the socket part and dowel part are worn.

FIG. 9 is a view similar to FIG. 6, but showing the dowel with ribs having square cross section.

FIG. 10 is a cross section taken through coupled parts fabricated according to FIG. 9.

In the embodiment of the invention shown in FIGS. 1-5, framing members 10 may be taken as typical of window frame, sash, curtainwall, etc., metal extruded frame members which must be coupled one to another in the course of completing the frame. Many different sizes, shapes and configurations of framing elements are required in modern building practice, the particular element 10 shown in the drawing being merely by way of example. As shown in FIG. 3, the frame members 10 may intersect at a right angle, the ends of the frame members being cut on diagonals to intersect at a miter joint.

According to one aspect of the present invention, each frame member 10 is provided with end sockets 11 having opposed planar walls 16, 17 with ribs 12 extending longitudinally of the respective members. The sockets 11 and ribs 12 are desirably fabricated in the course of extruding the metal framing member 10. These members may conventionally be fabricated of aluminum, stainless steel, or any other metal, plastic or other building material suitable for use as a frame.

The dowel 13 is best shown in FIG. 1. The dowel can be shaped in any manner to conform to the angle at which the framing members 10 intersect. In the example given herein, the dowel 13 has two legs 14 which intersect at a right angle. Each leg 14 is provided with opposed planar surfaces with transverse surface ribs 15. In practice the dowel 13 may be extruded of metal similar to the metal of the framing members 10 and in a continuous strip which may then be cut transversely into discrete dowels 13 as shown in FIG. 1. The ribs on both the dowels and sockets are desirably triangular in cross section, with sharp apices.

The apices of the ribs 12 at diametrically opposite walls 16 and 17 of the frame member 10 are less widely spaced by a few thousandths of an inch than the apices of the transversely related ribs 15 on opposite sides of the respective legs 14 of the dowel 13. Accordingly, when the dowel is inserted into the socket, high pressure must be used to force the dowel into place. In practice I use hydraulic presses under closing pressure which may range as high as two or three tons. Accordingly, as the dowel is forced into the socket, the ribs 12 on the socket walls 16, 17, these being aligned in the direction in which the dowel is closed into the socket, cut into or score notches 18 in the apices 19 of the transverse ribs 15 of the dowel, as is best shown in FIGS. 4 and 5.

Because the metal is somewhat resilient, it will yield somewhat in the vicinity of the notches and the interengaged rib peaks will be biased toward each other by the resiliency of the deformed peaks, thus to securely interlock the parts together at each point where the ribs of one member engage the ribs on another member.

Because of the relatively large number of ribs on each member in this embodiment of the invention, there will be a very great number of separate points at which the parts will interlock. In the construction shown in the drawing, there may be as many as three or four hundred separate interlocking connections spaced in a uniform grid pattern on both sides of the dowel.

The dowel is held in the socket by such a widely distributed pattern of interlocking ribs that it is virtually impossible to loosen or separate the dowel from the socket. The only way that I know to separate the parts is to use a hydraulic press in reverse.

The frame member 23 shown in FIG. 2 is specifically different from frame members 10 shown in FIGS. 1 and 3. Frame member 23 has a C-shaped channel socket with one unbroken side 24 and an opposite side which has short side portions 25 and an open slot 27 therebetween. The facing surfaces of channel sides 24, 25 are provided with longitudinal ribs 26 between which the dowel 13 is forced as aforesaid. The dowel is securely interlocked in the socket, even though side 25 is partially open at 27.

Additional embodiments of the invention are shown in FIGS. 6 through 10. In these embodiments only one of the respective socket and dowel parts is provided with ribs.

In FIG. 6 the socketed part 32 is provided on the walls of its socket 33 with longitudinally extending ribs 34. The dowel 35 has smooth surfaces. The spacing between the apices of the ribs 34 on opposite walls of the socket 33 is slightly less than the spacing between the correspondingly opposite smooth walls on dowel 35. Accordingly, when the dowel 35 is closed into the socket, ribs 34 will score or cut into the smooth wall of the dowel to form grooves into which the ribs are interlocked. Only the apices of ribs 34 engage the walls of the dowel.

FIGS. 7 and 8 illustrate how the present invention minimizes the undesirable effects of pressure and stress which result from manufacturing tolerances in the initial fabrication of the socket and dowel part. FIG. 7 illustrates a situation in which the socketed part 36 and the dowel part 37 are fabricated from relatively new dies. Accordingly, dowel 37 has minimum dimension within manufacturing tolerance and the socket has maximum dimension within manufacturing tolerance. Thus there is a minimum of area of contact between the ribs 38 on the socketed part 36 and the smooth face 39 of the dowel 37. As aforestated, the area of the dowel and socket which are in contact is greatly reduced to minimize the pressure required to close the parts and to avoid inducing excessive dislocation and deformation in the parts. Gaps or voids 40 are left between the parts of the dowel and socket in direct contact. Nothwithstanding the minimum area of contact, the dowel 37 is nevertheless securely implanted in the socket. Ribs 38 are uniformly distributed with respect to the surface of the dowel.

FIG. 8 illustrates a situation in which the dies by which the socket part 42 and the dowel part 43 have been manufactured have become worn. The dowel has maximum dimensions within manufacturing tolerance and the socket has minimum dimensions within manufacturing tolerance. Accordingly, there is a much greater area of contact between the ribs 44 on the socket part 42 and the surface 45 of the dowel 43. Notwithstanding this greater area of contact, there are still substantial gaps 46 where no part of the dowel engages the socket ribs. Even in the condition illustrated in FIG. 8, the pressure required to close the dowel into the socket is less than it would be if the socket had smooth walls.

With smooth walls on both the dowel and socket parts, even where the dies are new, there will be 100 percent surface contact between the dowel and socket. As the dies wear and the dowel "grows" and the socket "shrinks," the dowel of such a coupling will have to gouge or plow increasing amounts of material from the walls of the socket with the resultant stresses and increased pressure requirements herein referred to.

In the device of the present invention, however, even at the maximum tolerance for a worn set of dies, the pressure required to close the dowel into the socket and the stresses induced thereby are less than with smooth wall dowel and socket parts formed of new prior art dies.

Of course, the area of contact between the dowel and socket is even still further reduced in the embodiment of the invention shown in FIGS. 1 through 5 in which both parts are ribbed. FIG. 4 illustrates how the notches 18 formed in the dowel member 14 will progressively increase in size as the dies wear. Parts fabricated from partly worn dies will form notches in the dowel ribs shown in dotted lines at 47 and a die which is almost completely worn will produce parts which will create even deeper notches shown in dotted lines at 48.

All of the ribs thus far described are triangular in cross section and have relatively sharp apices. FIGS. 9 and 10 illustrate dowel and socket parts in which the dowel part 50 has ribs 51 which are substantially square in cross section. The socket part 52 may have smooth walls, as illustrated in these figures, or may have transverse ribs as suggested in FIGS. 1 through 5, which may be triangular in cross section or square in cross section. FIG. 10 illustrates a dowel 50 having ribs of square cross section implanted in the socketed part 52 of FIG. 9. The ribs are usually relatively closely spaced, i.e., the cross section of the grooves therebetween is substantially the same as that of the ribs. This is not an absolute requirement, however, as indicated in FIGS. 9 and 10 where the ribs are relatively widely spaced, the cross section of the grooves being greater than that of the ribs.

Another advantage of providing ribs on one or the other or both the dowel or socket parts is that the grooves between the ribs provide voids to receive particles of metal such as chips gouged out by the ribs.

To further enhance the bond between the dowel and socket of any embodiment of the invention, I may optionally coat the surfaces of the dowel or the socket, or both, with an adhesive indicated by reference character 22 in FIG. 5. When the parts are closed, the adhesive will set to further bond the parts together. The adhesive also fills in the gaps between the ribs and grooves to function as a weather seal.

In practice I use a chemical setting adhesive, such as an epoxy resin. Accordingly, the adhesive will set through chemical action without need for application of heat or evaporation of any solvent. Such adhesives ordinarily have a bonding force of 2,000 or 3,000 pounds per square inch of dowel and socket surface exposed thereto. Because the ribs with which the parts are provided increase the overall surface area of the parts exposed thereto, the total bonding force of the adhesive is greatly increased in couplings fabricated according to the present invention, as compared to prior art couplings having smooth wall parts.

The present invention has an additional advantage in that the stiffness and hardness of the dowel can be greatly increased over those heretofore used. Ordinarily the alloy composition of the socket part is relatively soft because of the requirements for applying a finish thereto and to reduce cost. The dowel, however, does not require finishing and by weight represents a relatively small part of the total weight of the assembly. Accordingly, extreme hardness and stiffness of the dowel is desirable.

It has not been possible heretofore to use dowels of optimum stiffness and hardness because of the excessive pressure required to close the dowel into the socket. Dowels heretofore used in practice had to be made sufficiently soft to yield to relieve excessive stresses caused by the closing operation. According to the present invention, however, the reduction in pressure and stresses achieved by reducing the areas of the parts which contact one another is such that an extremely hard and stiff dowel can be used, this being the optimum condition for a strong coupling.

The adhesive has a further advantage in inhibiting or preventing corrosion of the parts contacted thereby and retarding or preventing galvanic action therebetween.

I claim:

1. A coupling comprising a socketed part and a dowel respectively having substantially fixed cross sections and sets of transversely related ribs, the respective sets of socket and dowel ribs being disposed at 90° and the ribs of one of said sets being aligned in the direction in which the dowel is inserted into the socket, the ribs on opposite sides of the socket being less widely spaced than the ribs on opposite sides of the dowel for interference with the ribs on the dowel when the dowel is inserted axially into the socket, one set of ribs being interlocked with the other set in a uniformly distributed grid pattern after the dowel is inserted.

2. The coupling of claim 1 in further combination with an adhesive in the otherwise unoccupied spaces between said ribs.

3. The coupling of claim 1 in which said socketed part comprises a C-channel, one side of which is partially open.

4. The coupling of claim 1 in which said socketed part comprises a box section closed completely around the dowel.

5. The coupling of claim 1 in which said dowel has two ribbed legs, one of said legs being coupled to said socketed part, and a second transversely ribbed socketed part coupled to the other of said legs.

6. The device of claim 5 in which said socketed parts intersect at a miter joint, said legs of the dowel being correspondingly angled.

7. The combination with two frame members, each having a socket of substantially fixed cross section, of a dowel connector for coupling said frame members, said dowel and sockets respectively having transversely related sets of ribs, the respective sets of socket and dowel ribs being disposed at 90° and the ribs of one of said sets being aligned in the direction in which the dowel is inserted into the socket, diametrically oppositely disposed ribs in said sockets being less widely spaced than diametrically oppositely disposed ribs on the dowel for interference between said sets, one of said sets of ribs having notches cut therein by the other set of ribs when the dowel is inserted axially into the socket.

8. In a coupling comprising dowel and socket parts made from dies which wear and pursuant to which the measurements of said parts will vary within manufacturing tolerances, said dowel and socket parts having interfering surfaces which interlock when the parts are closed, the improvement to minimize the undesirable effects of pressure and stress resultant from such manufacturing tolerances and comprising on at least one of said parts a series of ribs aligned in the direction in which the parts are closed whereby to materially reduce the area of the interfering surface of said part which is exposed to an interfering surface on the other said part, the cross sectional spacing of the interfering surface on the socket being less than the cross sectional spacing of the ribs, the interfering surface of the other said part comprising a series of ribs disposed transversely to the ribs first mentioned, said dowel and socket parts having substantially fixed cross section.

9. The coupling of claim 8 in which said ribs have inclined sides, in combination with a chemical settng adhesive in the spaces between said ribs.

References Cited in the file of this patent

UNITED STATES PATENTS

| | | |
|---|---|---|
| 569,235 | Rockwell | Oct. 13, 1896 |
| 2,101,349 | Sharp | Dec. 7, 1937 |
| 2,147,343 | Hokanson | Feb. 14, 1939 |
| 2,177,364 | Fotsch | Oct. 24, 1939 |
| 2,546,962 | Best | Apr. 3, 1951 |
| 2,587,471 | Hess | Feb. 26, 1952 |
| 2,861,659 | Hagerty et al. | Nov. 25, 1958 |